L. E. CLAWSON & F. L. DOW.
VEHICLE TIRE.
APPLICATION FILED DEC. 4, 1908.
947,371.
Patented Jan. 25, 1910.
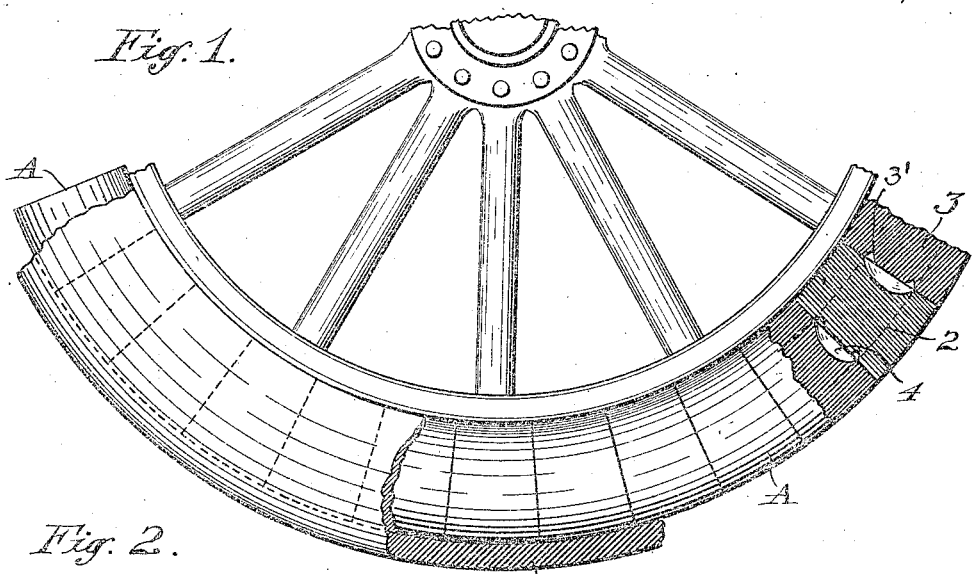
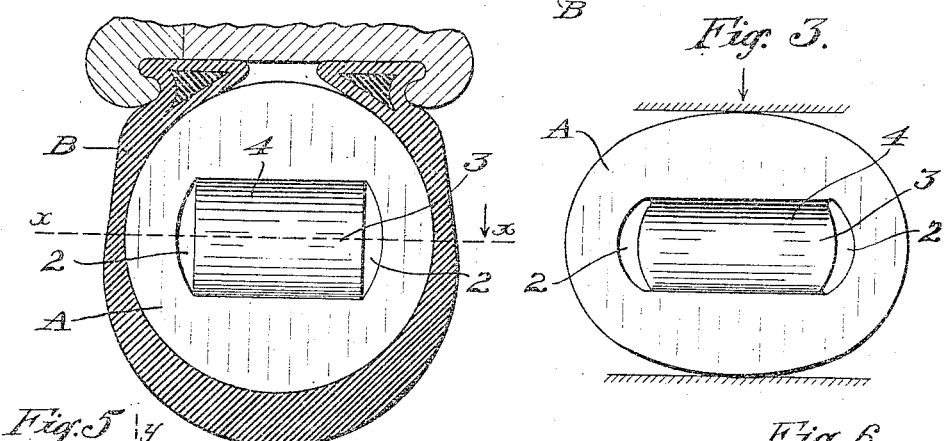
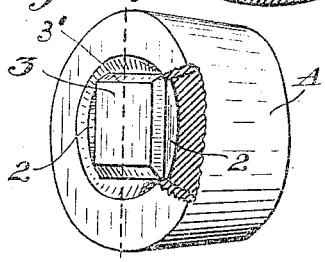
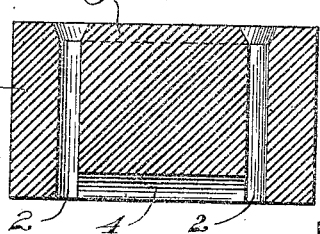
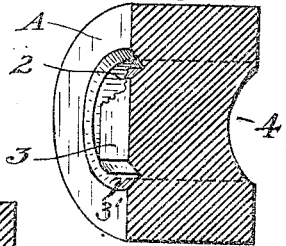
WITNESSES:
Roni S. Berry,
F. E. Maynard,
INVENTORS
LEONARD E. CLAWSON
AND
FREDRICK L. DOW
BY Geo. H. Strong.
THEIR ATTORNEY.

UNITED STATES PATENT OFFICE.

LEONARD E. CLAWSON AND FREDRICK L. DOW, OF SAN FRANCISCO, CALIFORNIA.

VEHICLE-TIRE.

947,371.  Specification of Letters Patent.  Patented Jan. 25, 1910.

Application filed December 4, 1908. Serial No. 465,935.

*To all whom it may concern:*

Be it known that we, LEONARD E. CLAWSON and FREDRICK L. DOW, residing in the city and county of San Francisco and State of California, have invented new and useful Improvements in Vehicle-Tires, of which the following is a specification.

Our invention relates to improvements in vehicle tires having in view the production of a tire with sufficient elasticity to relieve the jar and shock of road-travel; and at the same time of such a character that it cannot be rendered inoperative by puncture, or other similar accident.

It consists in the peculiar construction of the tire, and in details of construction which will be more fully explained by reference to the accompanying drawings, in which—

Figure 1 is a partial elevation of a wheel and tire partly in section. Fig. 2 is an end view of one of the sectional supports. Fig. 3 is an end view of one of the sectional supports in a compressed position. Fig. 4 is a horizontal section on the line $x$—$x$ Fig. 2.
Fig. 5 is a perspective view of a sectional support, showing the end opposite that seen in Fig. 2. Fig. 6 is a sectional perspective on the line $y$—$y$ Fig. 5.

It is the object of our invention to provide a tire which is especially designed for use upon automobiles, and generally for heavy vehicles such as are employed for transportation of goods.

It consists essentially of an interior sectional support A, which may be inclosed in any suitable outer casing as at B having flanges or other means for securing the whole to the vehicle wheel.

Suitable slots or channels 2 are made in the solid rubber or elastic material of the section A, these slots being normally of substantially plano-convex form and they extend entirely through the part A in a longitudinal direction. Between the slots is left a web portion 3, which remains attached along its long sides to the part A, said web portion being concaved transversely as shown at 4. As shown, one end of the part A, which is adjacent to the opposite end of the next block, is provided with a V-shaped groove 3′, the part inclosed by this groove standing opposite to a central depression 4 in the next adjacent section A. The complete tire is made up of these sections A and they are designed to fill the outer casing B from end to end. The outer casing is then strongly compressed and its flanges are locked to the wheel rim in the usual or any suitable manner.

The operation of this tire will then be as follows: A vertical pressure in the tire tends to spread the tire transversely by reason of the slots or channels 2 which allow a considerable yielding and elastic movement. The webs 3 with the recesses 4 made in them also provide for a certain amount of yielding in the direction of their length; also while the web unites certain portions of the same section, the whole section is sufficiently elastic and yielding to provide a suitable bearing for vehicles of this kind.

Having thus described our invention, what we claim and desire to secure by Letters Patent is—

1. In a vehicle tire, sections adapted to fit the periphery of the wheel, each of said sections having an internal transverse web whose opposite ends are separated from the corresponding walls of the section to form channels which are adapted to assume a concavo-convex form when pressure is applied to the tire.

2. In a tire of the character described, sections having a peripheral form of the required shape of the tire, and ends meeting to form a continuous circumferential tire, said sections having normally plano-convex open slots made in each side and extending through the material of the sections around the wheel, and transverse webs between the outer walls of said slots having their ends forming the inner walls of said slots, and having their intermediate portion connected to the body of the section.

3. In a vehicle tire of the character described, a series of abutting sections, an inclosing casing within which said sections are fitted to extend around the circumference of a wheel, said sections having normally plano-convex slots upon opposite sides of the center and registering with each other, and transverse webs between said slots, each having one side concaved to produce an open space between said side and a contiguous section.

In testimony whereof we have hereunto set our hands in presence of two subscribing witnesses.

LEONARD E. CLAWSON.
FRED. L. DOW.

Witnesses:
CHARLES EDELMAN,
WM. E. EASTMAN.